US012676103B2

(12) United States Patent
Hu

(10) Patent No.: US 12,676,103 B2
(45) Date of Patent: Jul. 7, 2026

(54) DISPLAY DRIVE CIRCUIT COMPRISING OPERATIONAL AMPLIFIER ALLOWING CONNECTION TO ARBITRARY LOAD CAPACITANCE

(71) Applicant: Chipone Technology (Beijing) Co., Ltd., Beijing (CN)

(72) Inventor: Longshan Hu, Beijing (CN)

(73) Assignee: Chipone Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/637,164

(22) Filed: Apr. 16, 2024

(65) Prior Publication Data

US 2024/0265858 A1 Aug. 8, 2024

Related U.S. Application Data

(63) Continuation of application No. PCT/CN2023/106798, filed on Jul. 11, 2023.

(30) Foreign Application Priority Data

Jul. 12, 2022 (CN) ......................... 202210821620.6

(51) Int. Cl.
*G09G 3/32* (2016.01)

(52) U.S. Cl.
CPC ....... *G09G 3/32* (2013.01); *G09G 2310/0291* (2013.01); *G09G 2320/0223* (2013.01)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

| | | | |
|---|---|---|---|
| 5,204,639 | A | 4/1993 | Moore et al. |
| 6,580,325 | B1 | 6/2003 | Aude |

(Continued)

FOREIGN PATENT DOCUMENTS

| | | |
|---|---|---|
| CN | 101471632 | 7/2009 |
| CN | 104900211 | 9/2015 |

(Continued)

OTHER PUBLICATIONS

International Search Report mailed Sep. 10, 2023, in PCT/CN2023/106798, 4 pages.

(Continued)

*Primary Examiner* — Ke Xiao
*Assistant Examiner* — Nelson Lam
(74) *Attorney, Agent, or Firm* — Henry Patent Law Firm PLLC

(57) ABSTRACT

A drive circuit, a display drive chip, a display apparatus, and an electronic apparatus are provided. The drive circuit includes a first stage circuit, a second stage circuit and an auxiliary circuit. The first stage circuit is configured to receive and amplify a first input signal and a second input signal to acquire a first output signal and a second output signal and output the first output signal and the second output signal to the second stage circuit. The second stage circuit is configured to output a third output signal based on the first output signal and the second output signal to drive a load. The second stage circuit is further connected to the first stage circuit via a Miller capacitor. The auxiliary circuit is connected to the first stage circuit and the second stage circuit for reducing an output impedance of the first stage circuit.

18 Claims, 7 Drawing Sheets

(58) Field of Classification Search

CPC ...... G09G 3/3233; G09G 3/3241; G09G 3/36; G09G 3/3611; G09G 3/3614; G09G 3/3625; G09G 3/364; G09G 3/3644; G09G 3/3648; G09G 3/3677; G09G 3/3681; G09G 3/3685; G09G 3/3688; G09G 3/3692; G09G 3/3696; G09G 2310/0291

USPC ........................................ 345/76–83, 87–104

See application file for complete search history.

(56) References Cited

U.S. PATENT DOCUMENTS 8,890,610 B2 11/2014 Brantley et al.
2005/0134537 A1* 6/2005 Tobita ................. H03F 3/45753 345/87
2006/0097791 A1* 5/2006 Shuler, Jr. ................. H03F 1/08 330/292
2010/0148857 A1* 6/2010 Chellappa ............... G05F 3/242 327/538
2011/0063200 A1* 3/2011 An ....................... G09G 3/3688 345/98
2011/0291760 A1* 12/2011 Maruyama .......... H03F 3/45192 330/257
2012/0182075 A1* 7/2012 Ivanov ................ H03F 3/45192 330/310
2012/0280965 A1* 11/2012 Lee ...................... G09G 3/3696 345/212
2014/0218112 A1* 8/2014 Brantley ............. H03F 3/45192 330/254
2015/0103066 A1* 4/2015 Tsuchi ................ H03F 3/45076 345/212
2016/0063907 A1* 3/2016 Lin ........................ H04B 15/00 345/204
2016/0226454 A1* 8/2016 Mastantuono .......... H03F 3/193
2022/0407480 A1* 12/2022 Parkhurst ............ H03F 3/45269

FOREIGN PATENT DOCUMENTS

CN 105989797 10/2016
CN 106921356 7/2017
CN 109189137 1/2019
CN 109450382 3/2019
CN 110488908 11/2019
CN 111934677 11/2020
CN 114039560 2/2022
CN 115188320 10/2022
TW 701902 8/2020
WO 2019127574 7/2019

OTHER PUBLICATIONS

Aminzadeh, et al., "Global impedance attenuation network for multistage OTAs driving a broad range of load capacitor", International Journal of Circuit Theory and Applications, vol. 48 No. 2, Jan. 13, 2020, pp. 181-197, 17 pages.
Grasso, et al., "High-Performance Four-Stage CMOS OTA Suitable for Large Capacitive Loads", IEEE Transactions on Circuits and Systems—I: Regular Papers, vol. 62, No. 10, Oct. 2015, pp. 2476-2484, 9 pages.
EPO, Extended European Search Report issued in Application No. 23838944.9 on Dec. 23, 2024, 16 pages.

* cited by examiner

DISPLAY DRIVE CIRCUIT COMPRISING OPERATIONAL AMPLIFIER ALLOWING CONNECTION TO ARBITRARY LOAD CAPACITANCE

CROSS-REFERENCE TO RELATED APPLICATION

The present application is a continuation of International Application PCT/CN2023/106798, filed Jul. 11, 2023, which claims the benefit of a priority of Chinese patent application No. 202210821620.6, filed with the China National Intellectual Property Administration on Jul. 12, 2022, the entire contents of all of which are incorporated herein by reference.

TECHNICAL FIELD

The present disclosure relates to the field of integrated circuits, and in particular to a drive circuit, a display drive chip, a display apparatus, and an electronic apparatus.

BACKGROUND

An operational amplifier is a circuit unit with a very high magnification. It is widely used in the field of integrated circuits, so problems that may arise in different application scenarios have to be taken into consideration when designing an operational amplifier. A common problem is that the load capacitance of an operational amplifier is uncertain. For example, when an operational amplifier is used in a drive circuit to drive LED display, many LEDs can be driven, and the number of the LEDs is determined by the user. Therefore, when designing an operational amplifier, it should be considered that the load capacitance of the operational amplifier may be approximately any value. Moreover, in some application scenarios, an operational amplifier may be used as a gain amplifier. The gain amplifier requires that the output has a certain magnification with respect to the input, so another problem is that the transient response of the operational amplifier (a process in which the output changes to a steady state when the input changes) should be smooth, that is, the value of the output voltage has no overshoot, which usually requires a phase margin greater than 60. This is very difficult for Miller-compensated operational amplifiers.

Therefore, it has become a research hotspot in this field to design a Miller-compensated drive circuit that can meet the above requirements.

SUMMARY

In view of the foregoing, the present disclosure provides a drive circuit, a display drive chip, a display apparatus, and an electronic apparatus. The drive circuit, as a Miller-compensated drive circuit, can meet the needs of connecting to an arbitrary load capacitance and having a smooth transient response.

According to one aspect of the present disclosure, a drive circuit is provided, including a first stage circuit, a second stage circuit, and an auxiliary circuit, where the first stage circuit is configured to receive a first input signal and a second input signal and amplify the first input signal and the second input signal to acquire a first output signal and a second output signal and output the first output signal and the second output signal to the second stage circuit, the second stage circuit is configured to output a third output signal based on the first output signal and the second output signal to drive a load, and the second stage circuit is connected to the first stage circuit via a Miller capacitor, and the auxiliary circuit is connected to the first stage circuit and the second stage circuit for reducing an output impedance of the first stage circuit.

In one possible implementation, the auxiliary circuit includes a first resistor and a second resistor, the first output signal is output by a first end of the first stage circuit, and the second output signal is output by a second end of the first stage circuit, the first resistor is connected between a power supply voltage and the first end of the first stage circuit, and the second resistor is connected between the second end of the first stage circuit and a ground.

In one possible implementation, the auxiliary circuit further includes a first transistor and a second transistor, the first transistor and the first resistor are connected in series between the power supply voltage and the first end of the first stage circuit, a current flowing through the first resistor also flows through a first electrode and a second electrode of the first transistor, a gate of the first transistor is connected to a farther one of the first and second electrodes of the first transistor from the power supply voltage, and the first transistor is configured to reduce the current flowing through the first resistor, and the second transistor and the second resistor are connected in series between the second end of the first stage circuit and the ground, a current flowing through the second resistor also flows through a first electrode and a second electrode of the second transistor, a gate of the second transistor is connected to a farther one of the first and second electrodes of the second transistor from the ground, and the second transistor is configured to reduce the current flowing through the second resistor.

In one possible implementation, the auxiliary circuit further includes a third transistor and a fourth transistor, the third transistor, the first transistor, and the first resistor are connected in series between the power supply voltage and the first end of the first stage circuit, the current flowing through the first resistor also flows through a first electrode and a second electrode of the third transistor, a gate of the third transistor receives a first bias signal, and the third transistor is configured to control a maximum value of the current flowing through the first resistor to be smaller than a current value of a tail current of the first stage circuit, and the fourth transistor, the second transistor, and the second resistor are connected in series between the second end of the first stage circuit and the ground, the current flowing through the second resistor also flows through a first electrode and a second electrode of the fourth transistor, a gate of the fourth transistor receives a second bias signal, and the fourth transistor is configured to control a maximum value of the current flowing through the second resistor to be smaller than the current value of the tail current of the first stage circuit.

In one possible implementation, when the first bias signal causes the third transistor to operate in a linear region, the first output signal decreases and the current flowing through the first resistor increases; when the first output signal decreases such that the third transistor operates in a saturation region, the current flowing through the first resistor reaches the maximum value; when the second bias signal causes the fourth transistor to operate in the linear region, the second output signal increases and the current flowing through the second resistor increases; and when the second output signal increases such that the fourth transistor operates in the saturation region, the current flowing through the second resistor reaches the maximum value.

In one possible implementation, the second stage circuit includes a fifth transistor and a sixth transistor, where a first electrode of the fifth transistor is connected to the power supply voltage, a second electrode of the fifth transistor serves as a first end of the second stage circuit to output the third output signal, and a gate of the fifth transistor serves as a second end of the second stage circuit to receive the first output signal, and a first electrode of the sixth transistor is connected to the second electrode of the fifth transistor, a second electrode of the sixth transistor is connected to the ground, and a gate of the sixth transistor serves as a third end of the second stage circuit to receive the second output signal, where the fifth transistor and the sixth transistor have different polarities, the fifth transistor and the first transistor have same polarity, and the sixth transistor and the second transistor have same polarity.

According to another aspect of the present disclosure, a display drive chip is provided, including a plurality of display units and at least one drive circuit as described above, where the plurality of display units are connected to the third end of the second stage circuit of the drive circuit.

According to another aspect of the present disclosure, a display apparatus is provided, including the above display drive chip.

In one possible implementation, the display unit includes a display panel, and the display panel includes at least one of a liquid crystal display panel, a micro light emitting diode display panel, a light emitting diode display panel, a mini light emitting diode display panel, a quantum dot light emitting diode display panel, an organic light emitting diode display panel, a cathode ray tube display panel, a digital light processing display panel, a field emission display panel, a plasma display panel, an electrophoretic display panel, an electrowetting display panel, and a small pitch display panel.

According to another aspect of the present disclosure, an electronic apparatus is provided, including the above display apparatus.

In a drive circuit according to an embodiment of the present disclosure, the first stage circuit receives and amplify a first input signal and a second input signal to acquire a first output signal and a second output signal and output the first output signal and the second output signal to a second stage circuit, thereby realizing the amplification function and providing a bias for the second stage circuit; the second stage circuit outputs a third output signal based on the first output signal and the second output signal, thereby driving a load; and the second stage circuit is further configured to be connected to the first stage circuit via a Miller capacitor. Therefore, the drive circuit according to the embodiment of the present disclosure is a Miller-compensated drive circuit. An auxiliary circuit is connected to the first stage circuit and the second stage circuit so as to reduce an output impedance of the first stage circuit, such that a minimum value of a phase margin of the drive circuit increases during variation of the load capacitance and a smooth transient response is achieved, that is, the Miller-compensated drive circuit can meet the needs of connecting to an arbitrary load capacitance and having a smooth transient response.

Other features and aspects of the present disclosure will become evident from the detailed description of exemplary embodiments below with reference to the drawings.

BRIEF DESCRIPTION OF THE DRAWINGS

The drawings included in and forming part of the description, together with the description, illustrate exemplary embodiments, features, and aspects of the present disclosure and serve to explain the principles of the present disclosure.

DETAILED DESCRIPTION

Figure 1:
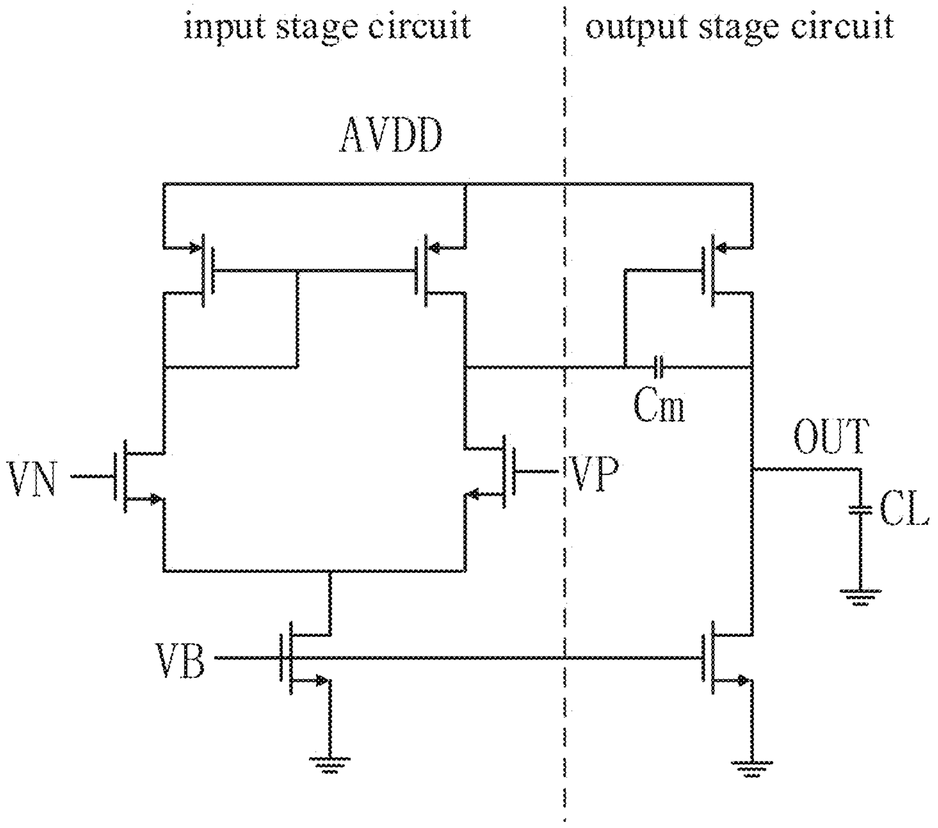
FIG. 1 (PRIOR ART)
FIG. 1 shows an exemplary structural diagram of a two-stage operational amplifier in the prior art.

Various exemplary embodiments, features, and aspects of the present disclosure will be described in detail below with reference to the drawings. The same reference signs in the drawings are used to designate elements that are functionally identical or similar. Although various aspects of the embodiments are shown in the drawings, unless otherwise specified, the drawings are not necessarily drawn to scale.

The word "exemplary" used here means "serving as an example, embodiment or illustration". Any embodiment described here as "exemplary" is not necessarily to be interpreted as superior to or better than other embodiments.

In addition, to better explain the present disclosure, numerous details are given in the following embodiments. It is appreciated by those skilled in the art that the present disclosure can still be implemented without some specific details. In some embodiments, methods, means, elements and circuits well known to those skilled in the art are not described in detail in order to highlight the gist of the present disclosure.

FIG. 1 shows an exemplary structural diagram of a two-stage operational amplifier in the prior art.

As shown in FIG. 1, the amplifier may be divided into an input stage circuit which is configured to provide a great voltage gain, and an output stage circuit which is configured to provide great current driving capability for the drive circuit. A Miller capacitor Cm is connected across an input end and an output end of the output stage circuit for phase compensation of the poles of the operational amplifier. In FIG. 1, VN and VP are the input signals of the two-stage operational amplifier, OUT is the output signal of the two-stage operational amplifier, VB is the bias voltage, AVDD is the power supply voltage, CL is the load capacitance, and Cm is the Miller capacitance.

When designing an operational amplifier, the specific value of the load capacitance CL in the practical application of the operational amplifier cannot be determined in advance. Therefore, the design of the operational amplifier should consider the fact that the load capacitance may be approximately any value. In some scenarios, the operational amplifier is used as a gain amplifier, so the design of the operational amplifier also needs to take smooth transient response into consideration, i.e., the output signal has no overshoot (which usually requires a phase margin greater than 60°). This is very difficult for operational amplifiers compensated by Miller capacitors in the prior art.

In order to solve the above technical problem, the present disclosure provides a drive circuit, a display drive chip, a display apparatus, and an electronic apparatus. The drive circuit, as a Miller-compensated drive circuit, can satisfy the needs of connecting to an arbitrary load capacitance and having a smooth transient response.

Figure 2:
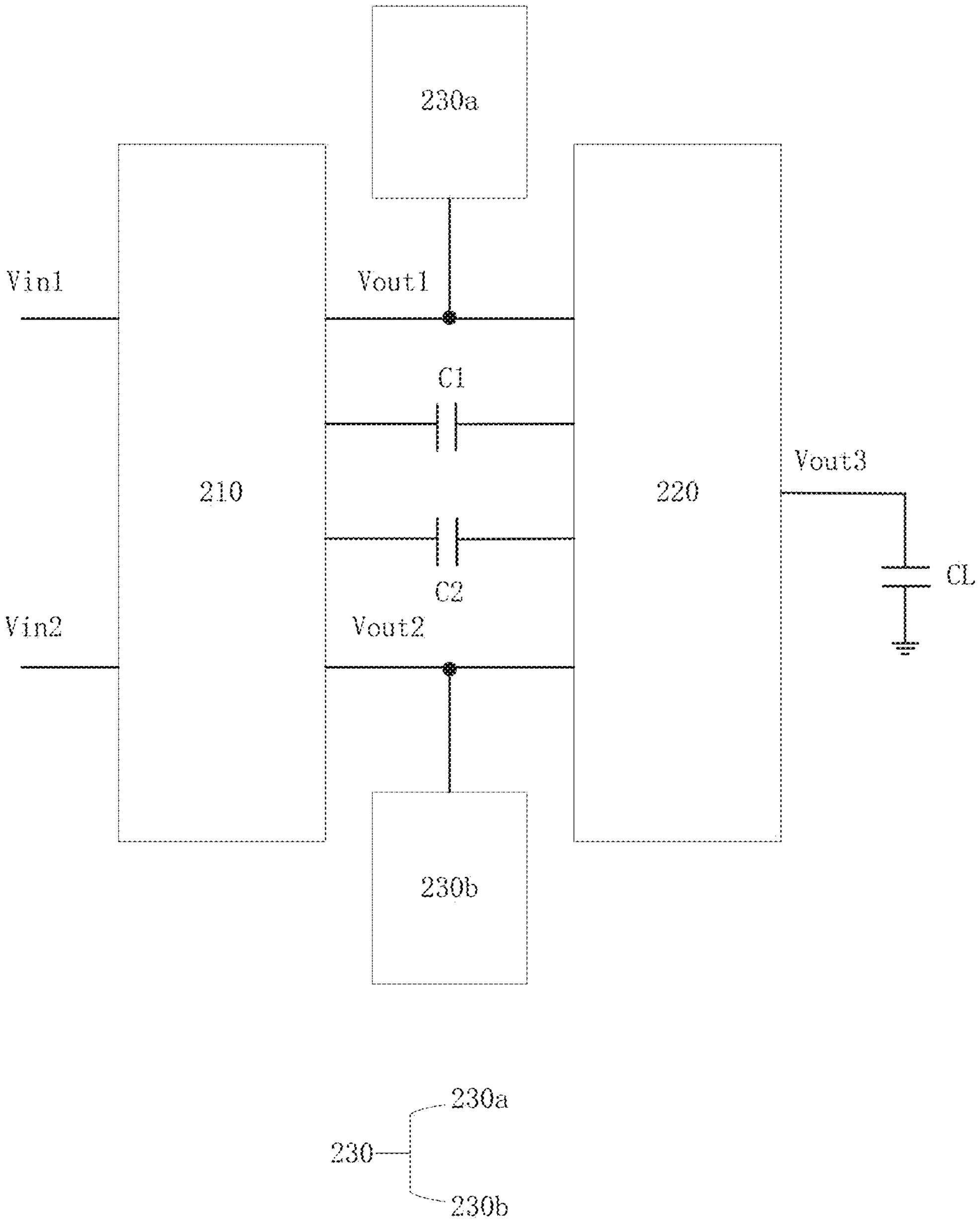
FIG. 2 shows an exemplary structural diagram of a drive circuit according to an embodiment of the present disclosure.

FIG. 2 shows an exemplary structural diagram of a drive circuit according to an embodiment of the present disclosure.

As shown in FIG. 2, in one possible implementation, the drive circuit includes a first stage circuit 210, a second stage circuit 220, and an auxiliary circuit 230.

The first stage circuit 210 is configured to receive a first input signal Vin1 and a second input signal Vin2 and amplify the first input signal Vin1 and the second input signal Vin2 to acquire a first output signal Vout1 and a second output signal Vout2 and output the first output signal Vout1 and the second output signal Vout2 to the second stage circuit 220.

Figure 3:
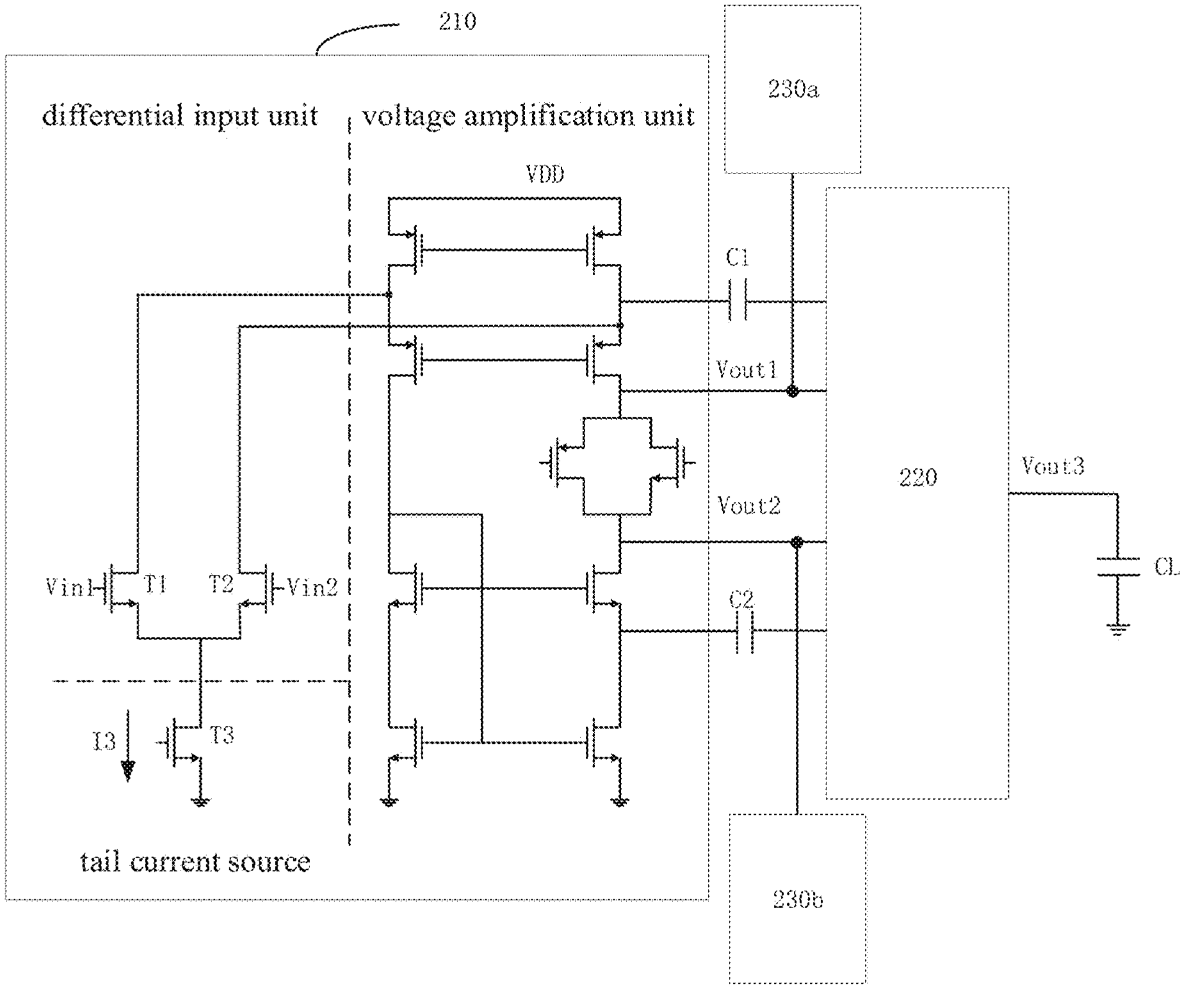
FIG. 3 shows an exemplary structural diagram of a first stage circuit 210 according to an embodiment of the present disclosure.

The first stage circuit 210 according to the embodiment of the present application may be a voltage gain amplification circuit implemented based on the prior art. FIG. 3 shows an exemplary structural diagram of the first stage circuit 210 according to the embodiment of the present disclosure. The circuit 210 includes a differential input unit, a tail current source, and a voltage amplification unit, where the differential input unit includes P-type transistors T1 and T2, gates of the transistors T1 and T2 are connected to differential input signals (the first input signal Vin1 and the second input signal Vin2), respectively, sources of the transistors T1 and T2 are connected to each other and are connected to the ground via the tail current source, and drains of the transistors T1 and T2 are connected to the voltage amplification unit to perform signal amplification processing through a current mirror structure formed by the transistors in the voltage amplification unit and provide a bias voltage (the first output signal Vout1 and the second output signal Vout2) to the second stage circuit 220. The tail current source may be realized by a P-type transistor T3, of which a gate may receive a control signal for controlling the output of a tail current I3, a source may be connected to the ground, and a drain is connected to the first electrodes of the transistors T1 and T2. VDD represents the power supply voltage.

It should be appreciated by those skilled in the art that the structure shown in FIG. 3 is only one example of the first stage circuit 210, and the first stage circuit 210 may further include more structures that can be realized in the prior art, as long as the first input signal Vin1 and the second input signal Vin2 can be amplified and the first output signal Vout1 and the second output signal Vout2 can be output to provide a bias for the second stage circuit. The specific structure of the first stage circuit 210 is not restricted in the present disclosure.

The second stage circuit 220 is configured to output a third output signal Vout3 based on the first output signal Vout1 and the second output signal Vout2 to drive the load CL. The second stage Circuit 220 is further connected to the first stage circuit 210 via Miller Capacitors C1 and C2.

Figure 4:
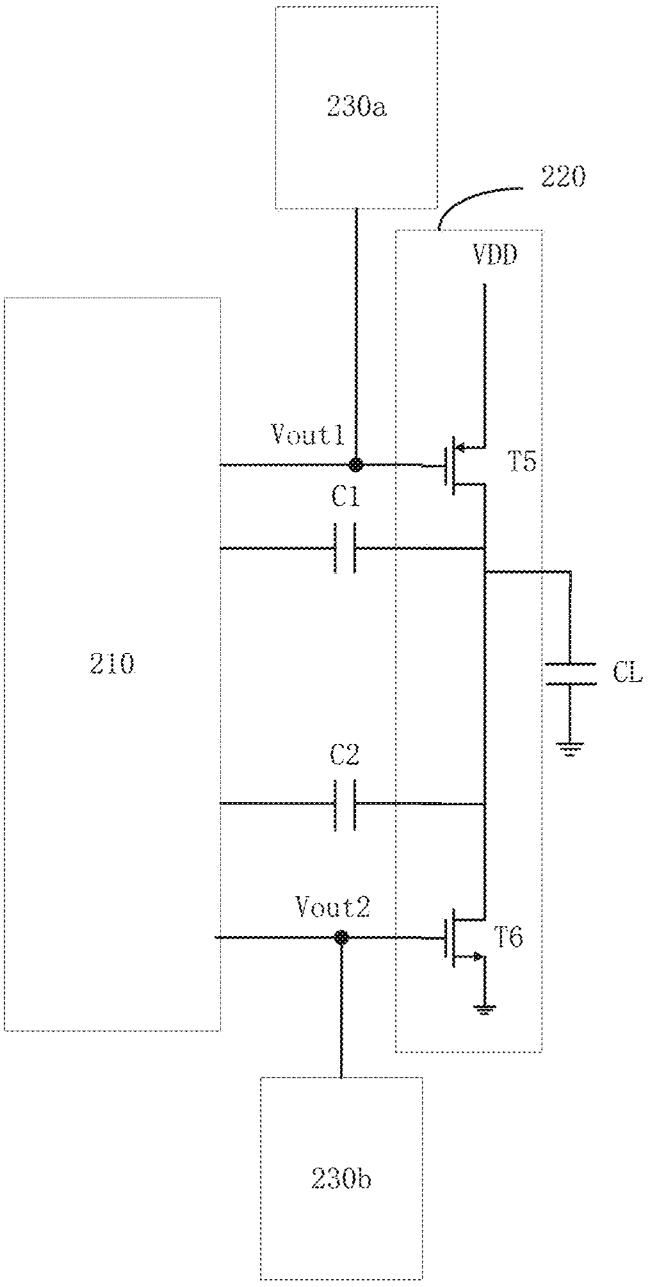
FIG. 4 shows an exemplary structural diagram of a second stage circuit 220 according to an embodiment of the present application.

The second stage circuit 220 may be implemented based on the prior art. FIG. 4 shows an exemplary structural diagram of the second stage circuit 220 according to an embodiment of the present application. As shown in FIG. 4, the circuit 220 may include transistors T5 and T6 with different polarities. By way of example, in the case where the transistor T5 is a PMOS transistor and the transistor T6 is an NMOS transistor, a first electrode (source) of the transistor T5 is connected to the power supply voltage, a gate of the transistor T5 receives the first output signal Vout1, a first electrode (source) of the transistor T6 is connected to the ground, and a gate of the transistor T6 receives the second output signal Vout2. A second electrode (drain) of the transistor T5 and a second electrode (drain) of the transistor T6 are connected to each other and serve as the third end of the second stage circuit 220, and the third end is further connected to the load CL, that is, the third output signal Vout3 may serve as the signal provided to the load CL. The second electrode (drain) of the transistor T5 and the second electrode (drain) of the transistor T6 are connected to the first stage circuit 210 via the Miller capacitors C1 and C2, respectively, in order to realize the phase compensation of poles of the circuit. The specific compensation mode may be implemented based on the prior art and will not be described here.

The auxiliary circuit 230 (including 230*a* and 230*b*) is connected to the first stage circuit 210 and the second stage circuit 220 to reduce the output impedance of the first stage circuit 210.

The output impedance of the first stage circuit 210 is associated with the phase margin of the drive circuit in such a manner that the smaller the output impedance of the first stage circuit 210, the greater the minimum value of the phase margin of the drive circuit during the variation of the load capacitance CL. When the phase margin is greater than 60%, it can be considered that the transient response of the drive circuit is smooth. Therefore, by reducing the output impedance of the first stage circuit 210 through the auxiliary circuit 230, the transient response of the drive circuit can be optimized.

In a drive circuit according to an embodiment of the present disclosure, the first stage circuit receives and amplify a first input signal and a second input signal to acquire a first output signal and a second output signal and output the first output signal and the second output signal to a second stage circuit, thereby realizing the amplification function and providing a bias for the second stage circuit; the second stage circuit outputs a third output signal based on the first output signal and the second output signal, thereby driving a load; and the second stage circuit is further configured to be connected to the first stage circuit via a Miller capacitor. Therefore, the drive circuit according to the embodiment of the present disclosure is a Miller-compensated drive circuit. An auxiliary circuit is connected to the first stage circuit and the second stage circuit so as to reduce an output impedance of the first stage circuit, such that a minimum value of a phase margin of the drive circuit increases during variation of the load capacitance and a smooth transient response is achieved, that is, the Miller-compensated drive circuit can satisfy the needs of connecting to an arbitrary load capacitance and having a smooth transient response.

The auxiliary circuit 230 in the embodiments of the present disclosure has a variety of structures. Several exemplary structures of the auxiliary circuit 230 and their advantages are described below with reference to FIGS. 5-7.

Figure 5:
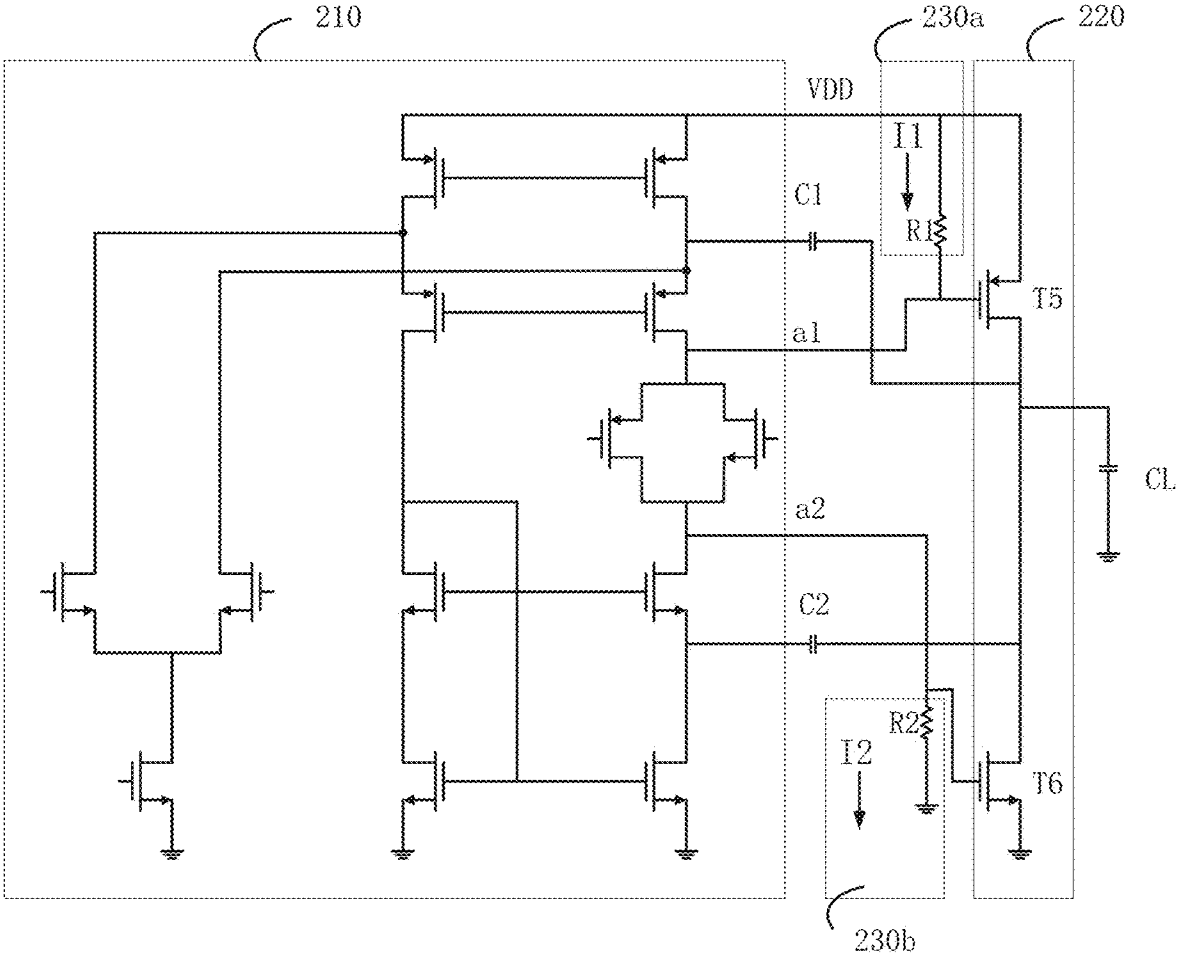
FIG. 5 shows an exemplary structural diagram of an auxiliary circuit 230 according to an embodiment of the present disclosure.

FIG. 5 shows an exemplary structural diagram of the auxiliary circuit 230 according to an embodiment of the present disclosure.

As shown in FIG. 5, in one possible implementation, the auxiliary circuit 230 includes a first resistor R1 and a second resistor R2. The first output signal Vout1 is output from a first end a1 of the first stage circuit 210, and the second output signal Vout2 is output from a second end a2 of the first stage circuit 210. The first resistor R1 is connected between the power supply voltage VDD and the first end a1 of the first stage circuit 210. The second resistor R2 is connected between the second end a2 of the first stage circuit 210 and the ground.

By way of example, as is clear from FIGS. 3 and 4, the first stage circuit 210 has two output ends a1 and a2, so when designing the auxiliary circuit 230, it is necessary to consider reducing the output impedances of the two output ends a1 and a2. The simplest way is to connect the two output ends a1 and a2 to the resistors, respectively, that is, as shown in FIG. 5, the first resistor R1 is connected between the first end a1 of the first stage circuit 210 and the power supply voltage VDD, and the second resistor R2 is connected between the second end a2 of the first stage circuit 210 and the ground GND. Hence, the auxiliary circuit 230 (including 230*a* and 230*b*) may include the first resistor R1 and the second resistor R2. The resistance values of the first resistor R1 and the second resistor R2 are not restricted in the embodiments of the present disclosure. In this case, the auxiliary circuit 230 is simple in structure, easy to implement, and low in cost.

However, in the circuit shown in FIG. 5, due to the existence of the first resistor R1 and the second resistor R2 in the auxiliary circuit 230 (including 230*a* and 230*b*), current will flow through the first resistor R1 and the second resistor R2. Moreover, for the transistor T5, the gate-source voltage is related to its threshold voltage, and the source voltage is a constant value of the power supply voltage VDD, so a gate voltage of the transistor T5 is related to the threshold voltage of the transistor T5. A current I1 flowing through the first resistor R1 should be equal to a ratio of a difference between the power supply voltage VDD and the gate voltage of the transistor T5 to the resistance value of the first resistor R1, so it can be considered that the current I1 flowing through the first resistor R1 takes the threshold voltage of the transistor T5 as a reference. Similarly, it can be considered that a current I2 flowing through the second resistor R2 takes the threshold voltage of the transistor T6 as a reference. The transistor T5 and the transistor T6 are two transistors with different polarities, so their threshold voltages may be different, which may cause the current I1 flowing through the first resistor R1 and the current I2 flowing through the second resistor R2 to be unequal. A relatively large difference between the two currents will lead to a relatively high offset voltage, which will reduce the stability of the drive circuit.

Figure 6:
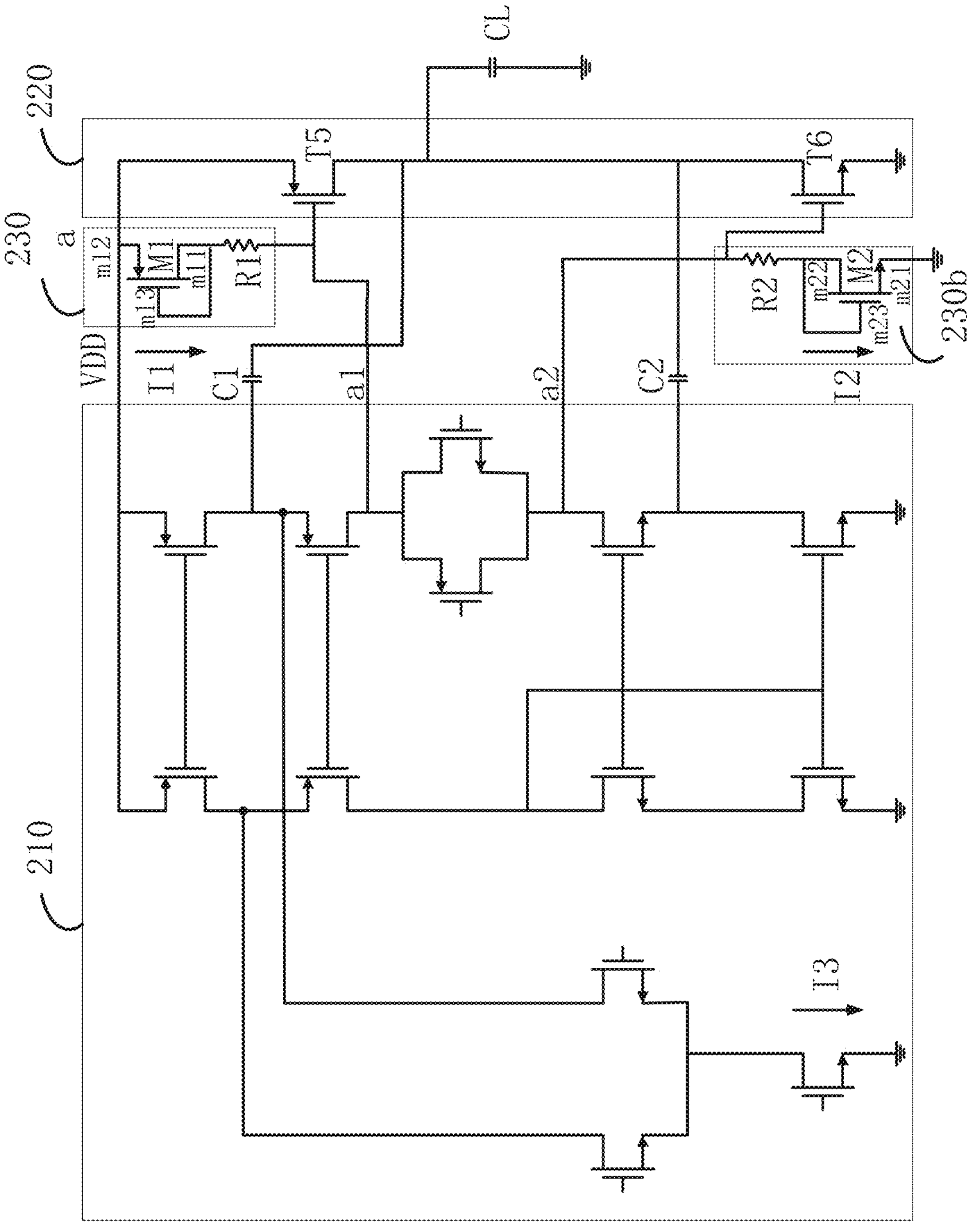
FIG. 6 shows another exemplary structural diagram of the auxiliary circuit 230 according to an embodiment of the present disclosure.

Therefore, the present disclosure provides another design of the auxiliary circuit 230. FIG. 6 shows another exemplary structural diagram of the auxiliary circuit 230 according to an embodiment of the present disclosure.

As shown in FIG. 6, in one possible implementation, the auxiliary circuit 230 further includes a first transistor M1 and a second transistor M2.

The first transistor M1 and the first resistor R1 are connected in series between the power supply voltage VDD and the first end a1 of the first stage circuit 210, and the current I1 flowing through the first resistor also flows through a first electrode m11 and a second electrode m12 of the first transistor M1; a gate m13 of the first transistor M1 is connected to one of the first electrode m11 and the second electrode m12 of the first transistor M1 which is far away from the power supply voltage VDD; and the first transistor M1 is configured to reduce the current I1 flowing through the first resistor.

The second transistor M2 and the second resistor R2 are connected in series between the second end a2 of the first stage circuit 210 and the ground, and the current I2 flowing through the second resistor R2 also flows through a first electrode m21 and a second electrode m22 of the second transistor M2; a gate m13 of the second transistor M2 is connected to one of the first electrode m21 and the second electrode m22 of the second transistor M2 which is far from the ground; and the second transistor M2 is configured to reduce the current I2 flowing through the second resistor R2.

In the example shown in FIG. 6, the first transistor M1 may be a P-type transistor, where the first electrode m11 of the first transistor M1 may be a drain which is connected to the first resistor R1, the second electrode m12 of the first transistor M1 may be a source which is connected to the supply voltage VDD, the one away from the supply voltage VDD may be the first electrode m11, and the first resistor is further connected to the first end a1 of the first stage circuit. The second transistor M2 may be an N-type transistor, where the first electrode m21 of the second transistor M2 may be a source which is connected to the ground, the second electrode m22 of the second transistor M2 may be a drain which is connected to the second resistor R2, the one away from the ground may be the second electrode m22, and the second resistor is further connected to the second end a2 of the first stage circuit. It should be appreciated by those skilled in the art that the first transistor and the second transistor may also be transistors of other polarities, which is not restricted in the present disclosure.

It is appreciated that, in addition to the connection mode shown in FIG. 6, the first resistor may be connected to the power supply voltage, the first transistor may be connected to the first end a1 of the first stage circuit, the second resistor may be connected to the ground, and the second transistor may be connected to the second end a2 of the first stage circuit, provided that the above connection mode in which the first transistor M1 and the first resistor R1 are connected in series between the power supply voltage VDD and the first end a1 of the first stage circuit 210, and the second transistor M2 and the second resistor R2 are connected in series between the second end a2 of the first stage circuit 210 and the ground is satisfied. The specific connection modes of the first transistor M1 and the first resistor R1 and the specific connection modes of the second transistor and the second resistor R2 are not restricted in the present disclosure.

The principle of reducing the current flowing through the first resistor and the current flowing through the second resistor by the auxiliary circuit shown in FIG. 6 is explained below with reference to the structure of the second stage circuit.

In one possible implementation, the second stage circuit includes the fifth transistor T5 and the sixth transistor T6.

The first electrode of the fifth transistor T5 is connected to the power supply voltage VDD, the second electrode of the fifth transistor T5 serves as a first end b1 of the second stage circuit 220 to output the third output signal, and the gate of the fifth transistor T5 serves as a second end b2 of the second stage circuit 220 to receive the first output signal Vout1.

The first electrode of the sixth transistor T6 is connected to the second electrode a2 of the fifth transistor T5, the second electrode of the sixth transistor T6 is connected to the ground, and the gate of the sixth transistor T6 serves as the third end of the second stage circuit to receive the second output signal Vout2.

The fifth transistor T5 and the sixth transistor T6 have different polarities, the fifth transistor T5 and the first transistor M1 have the same polarity, and the sixth transistor T6 and the second transistor M2 have the same polarity.

By way of example, the fifth transistor is the above transistor T5, the sixth transistor is the above transistor T6, the fifth transistor T5 and the sixth transistor T6 are transistors of different polarities, the fifth transistor T5 and the first transistor M1 may be of the same polarity, and the sixth transistor T6 and the second transistor M2 may be of the same polarity. For example, in the embodiment of the present disclosure, the fifth transistor T5 and the first transistor M1 may be P-type transistors, and the sixth transistor T6 and the second transistor M2 may be N-type transistors.

The first transistor M1 may be regarded as a diode when connected in the manner shown in FIG. 6. When the first transistor M1 is a P-type transistor, the threshold voltage of the first transistor M1 is the same as that of the fifth transistor T5 (transistors of the same polarity have the same threshold voltage). One of the first electrode m11 and the second electrode m12 of the first transistor M1 which is close to the power supply voltage VDD (the second electrode m12 in the example of FIG. 6) serves as a negative electrode of the diode, and the other electrode (the first electrode m11 in the example of FIG. 6) serves as a positive electrode of the diode, that is, the first transistor M1 serves as a diode and is inversely connected in the circuit, and the first transistor M1 is connected in series with the first resistor R1. Therefore, in this case, the current I1 flowing through the first resistor R1 is very low. Similarly, the second transistor M2 may be regarded as a diode when connected in the manner shown in FIG. 6. When the second transistor M2 is a N-type transistor, the threshold voltage of the second transistor M2 is the same as that of the sixth transistor T6 (transistors of the same polarity have the same threshold voltage). One of the first electrode m21 and the second electrode m22 of the second transistor M2 which is far away from the ground serves as a positive electrode of the diode, and the other electrode serves as a negative electrode of the diode, that is, the second transistor M2 serves as a diode and is inversely connected in the circuit, and the second transistor M2 is connected in series with the second resistor R2. Therefore, in this case, the current I2 flowing through the second resistor R2 is also very low. Since the current I1 flowing through the first resistor R1 and the current I2 flowing through the second resistor R2 are both low, even if I1 and I2 are not equal, the difference between them will not be large. In this case, the offset voltage of the drive circuit can be reduced to a very low level, thereby improving the stability of the drive circuit.

However, the circuit shown in FIG. 6 is more suitable for a drive circuit with high quiescent current. If the application scenario requires a drive circuit with micro-power consumption, the tail current I3 in the first stage circuit needs to be made low, and thus the circuit in FIG. 6 will cause the voltage conversion rate (slew rate) of the drive circuit to decrease. The reason behind this is that in order to increase the output voltage (third output signal Vout3) while the drive circuit is going through a voltage change, it is necessary to decrease the value of the first output signal Vout1 (or increase the value of the second output signal Vout2). In the circuit shown in FIG. 6, the first output signal Vout1 is reduced (or the second output signal Vout2 is increased) by mirroring the tail current I3. However, when the first output signal Vout1 is reduced (or the second output signal Vout2 is increased), the current I1 flowing through the first resistor R1 (or the current I2 flowing through the second resistor R2) becomes higher, and when the current I1 flowing through the first resistor R1 (or the current I2 flowing through the second resistor R2) is as high as the tail current I3, the first output signal Vout2 will no longer be reduced (or the second output signal Vout2 will no longer be increased), which will eventually lead to a decrease in the voltage conversion rate of the drive circuit.

Figure 7:
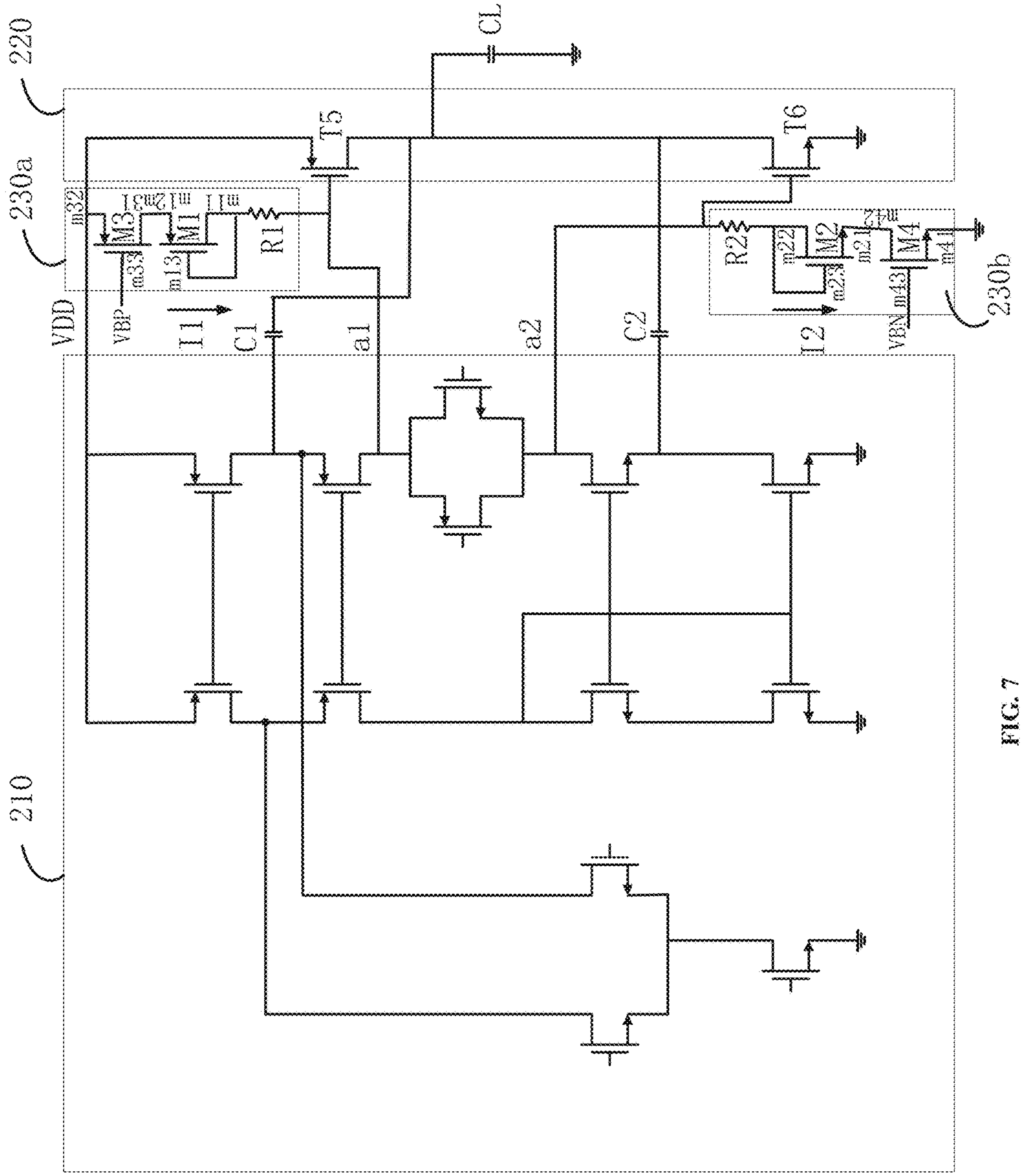
FIG. 7 shows another exemplary structural diagram of the auxiliary circuit 230 according to an embodiment of the present disclosure.

Therefore, the present disclosure provides another design of the auxiliary circuit. FIG. 7 shows another exemplary structural diagram of the auxiliary circuit 230 according to an embodiment of the present disclosure.

As shown in FIG. 7, in one possible implementation, the auxiliary circuit 230 further includes a third transistor M3 and a fourth transistor M4.

The third transistor M3, the first transistor M1, and the first resistor R1 are connected in series between the power supply voltage VDD and the first end a1 of the first stage circuit 210, and the current flowing through the first resistor R1 also flows through a first electrode m31 and a second electrode m32 of the third transistor M3; a gate m33 of the third transistor M3 receives a first bias signal VBP; and the third transistor M3 is configured to control the maximum value of the current I1 flowing through the first resistor R1 to be smaller than the current value of the tail current I3 of the first stage circuit 210.

The fourth transistor M4, the second transistor, and the second resistor R2 are connected in series between the second end a2 of the first stage circuit 210 and the ground, and the current I2 flowing through the second resistor R2 also flows through a first electrode m41 and a second electrode m42 of the fourth transistor M4; a gate of the fourth transistor M4 receives a second bias signal VBN; and the fourth transistor M4 is configured to control the maximum value of the current I2 flowing through the second resistor R2 to be smaller than the current value of the tail current I3 of the first stage circuit 210.

In the example shown in FIG. 7, the first transistor M1 may be a P-type transistor, where the first electrode m11 of the first transistor M1 may be a drain connected to the first resistor R1, and the second electrode m12 of the first transistor M1 may be a source connected to the first electrode m31 of the third transistor M3; the third transistor M3 may be a P-type transistor, where the first electrode m31 of the third transistor M3 may be a drain and the second electrode m32 of the third transistor M3 may be a source connected to the power supply voltage VDD. The second transistor M2 may be an N-type transistor, where the first electrode m21 of the second transistor M2 may be a source connected to the second electrode m42 of the four transistors M4, and the second electrode m22 of the second transistor M2 may be a drain connected to the second resistor R2; and the fourth transistor M4 may be an N-type transistor, where the first electrode m41 of the fourth transistor M4 may be a source connected to the ground, and the second electrode m42 of the fourth transistor M4 may be a drain. It should be appreciated by those skilled in the art that the first transistor, the second transistor, the third transistor, and the fourth transistor may also be transistors of other polarities, which is not restricted in the present disclosure.

It is appreciated that in addition to the connection mode shown in FIG. 7, the first resistor may be in series connection between the first transistor and the third transistor, and the second resistor may be in series connection between the fourth transistor and the second transistor, provided that the above connection mode in which the third transistor M3, the first transistor M1, and the first resistor R1 are connected in series between the power supply voltage VDD and the first end a1 of the first stage circuit 210, and the fourth transistor M4, the second transistor, and the second resistor R2 are connected in series between the second end a2 of the first stage circuit 210 and the ground is satisfied. The specific connection modes of the third transistor M3, the first transistor M1, and the first resistor R1 and the specific connection modes of the fourth transistor M4, the second transistor, and the second resistor R2 are not restricted in the present disclosure.

An exemplary method in which the third transistor M3 and the fourth transistor M4 control the current I1 flowing through the first resistor R1 and the current I2 flowing through the second resistor R2 will be described below with reference to FIG. 7.

In one possible implementation, when the first bias signal VBP causes the third transistor M3 to operate in the linear region, the first output signal Vout1 decreases and the current I1 flowing through the first resistor R1 increases.

When the first output signal Vout1 decreases such that the third transistor M3 operates in the saturation region, the current I1 flowing through the first resistor R1 reaches a maximum value.

When the second bias signal VBN causes the fourth transistor M4 to operate in the linear region, the second output signal Vout2 increases and the current I2 flowing through the second resistor R2 increases.

When the second output signal Vout2 increases such that the fourth transistor M4 operates in the saturation region, the current I2 flowing through the second resistor R2 reaches a maximum value.

By way of example, the first bias signal VBP and the second bias signal VBN may be set to fixed values, which are generated by a bias circuit (not shown) capable of stably outputting the bias voltage in the prior art and provided to the auxiliary circuit 230 (including 230*a* and 230*b*). In a normal state, the third transistor M3 and the fourth transistor M4 are pressed into a depth linear region by the first bias signal VBP and the second bias signal VBN, respectively. At this time, the current I1 flowing through the first resistor R1 and the current I2 flowing through the second resistor R2 are very low, which will not cause the drive circuit to introduce the offset voltage. When voltage conversion is required in the drive circuit, taking the first output signal Vout1 as an example, the voltage value of the first output signal Vout1 decreases and the current I1 flowing through the first resistor R1 increases. However, when the voltage value of the first output signal Vout1 drops to a certain value, the third transistor M3 enters the saturation region, and at this time the current I1 flowing through the first resistor R1 will no longer increase, that is, the current I1 flowing through the first resistor R1 reaches the maximum value at this time. As long as the maximum value is smaller than the tail current I3 of the first stage circuit 210, the voltage value of the first output signal Vout1 may continue to decrease without causing the problem that the voltage conversion rate of the drive circuit decreases.

Similarly, taking the second output signal Vout2 as an example, when the voltage value of the second output signal Vout2 increases, the current I2 flowing through the second resistor R2 increases. However, when the voltage value of the second output signal Vout2 increases to a certain value, the fourth transistor M4 enters the saturation region, and at this time the current I2 flowing through the second resistor R2 will no longer increase, that is, the current I2 flowing through the second resistor R2 reaches the maximum value at this time. As long as the maximum value is smaller than the tail current I3 of the first stage circuit 210, the voltage value of the second output signal Vout2 may continue to decrease without causing the problem that the voltage conversion rate of the drive circuit decreases.

It should be appreciated by those skilled in the art that the structures shown in FIGS. 5 to 7 are only examples of the auxiliary circuit 230, and the auxiliary circuit 230 may further include more structures as long as it is possible to reduce the output impedance of the first stage circuit 210. The specific structure of the auxiliary circuit 230 is not restricted in the present disclosure.

The present disclosure further provides a display drive chip, including a plurality of display units and at least one drive circuit as described above, where the plurality of display units are connected to a third end of a second stage circuit 220 of the drive circuit. The third end of the second stage circuit 220 may be an end of the second stage circuit 220 which is connected to the load, namely, an end which outputs the third output signal Vout3. The plurality of display units are the load mentioned above, and the capacitance values of the plurality of display units are the load capacitance of the drive circuit.

The present disclosure further provides a display apparatus, including the above display drive chip. The display drive chip according to the embodiment of the present disclosure may be formed as a universal drive chip and may be applied to display panels with different sub-pixel arrays, thereby reducing the design cost and the manufacturing cost.

In one possible implementation, the display unit includes a display panel, where the display panel includes at least one of a liquid crystal display panel, a micro light emitting diode display panel, a light emitting diode display panel, a mini light emitting diode display panel, a quantum dot light emitting diode display panel, an organic light emitting diode display panel, a cathode ray tube display panel, a digital light processing display panel, a field emission display panel, a plasma display panel, an electrophoretic display panel, an electrowetting display panel, and a small pitch display panel.

The present disclosure further provides an electronic apparatus, including the above display apparatus.

By way of example, the electronic apparatus in the embodiment includes, but is not limited to, a desktop computer, a television, a mobile device with a large-size screen such as a mobile phone and a tablet computer, and other common electronic apparatuses that require multiple chips to be connected in cascade to realize the drive.

By way of example, the electronic apparatus may also be a User Equipment (UE), a mobile device, a user terminal, a terminal, a handheld device, a computing device, a vehicle-mounted device, or the like. By way of example, some examples of terminals include a monitor, a smartphone or portable device, a mobile phone, a tablet computer, a laptop computer, a palmtop computer, a Mobile Internet device (MID), a wearable device, a Virtual Reality (VR) device, an Augmented Reality (AR) device, a wireless terminal in Industrial Control, a wireless terminal in self-driving, a wireless terminal in remote medical surgeries, a wireless terminal in Smart Grid, a wireless terminal in Transportation Safety, a wireless terminal in Smart City, a wireless terminal in Smart Home, a wireless terminal in Internet of Vehicles, and the like. For example, the server may be a local server or a cloud server.

Although the embodiments of the present disclosure have been described above, it will be appreciated that the above descriptions are merely exemplary, but not exhaustive, and is not limited to the disclosed embodiments. A number of variations and modifications may occur to one skilled in the art without departing from the scopes and spirits of the described embodiments. The terms used herein are selected to best explain the principles, practical applications, or improvements to techniques in the market of the embodiments, or to make the embodiments disclosed herein understandable to those skilled in the art.

What is claimed is:

1. A drive circuit, comprising a first stage circuit, a second stage circuit, and an auxiliary circuit, wherein the first stage circuit is configured to receive a first input signal and a second input signal, and amplify the first input signal and the second input signal to acquire a first output signal and a second output signal and output the first output signal and the second output signal to the second stage circuit, the second stage circuit is configured to output a third output signal based on the first output signal and the second output signal to drive a load, and the second stage circuit is connected to the first stage circuit via a Miller capacitor, and the auxiliary circuit is connected to the first stage circuit and the second stage circuit for reducing an output impedance of the first stage circuit, wherein the auxiliary circuit comprises a first resistor and a second resistor, the first output signal is output by a first end of the first stage circuit, and the second output signal is output by a second end of the first stage circuit, the first resistor is connected between a power supply voltage and the first end of the first stage circuit, and the second resistor is connected between the second end of the first stage circuit and a ground.

2. The drive circuit according to claim 1, wherein the auxiliary circuit further comprises a first transistor and a second transistor, the first transistor and the first resistor are connected in series between the power supply voltage and the first end of the first stage circuit, a current flowing through the first resistor also flows through a first electrode and a second electrode of the first transistor, a gate of the first transistor is connected to a farther one of the first and second electrodes of the first transistor from the power supply voltage, and the first transistor is configured to reduce the current flowing through the first resistor, and the second transistor and the second resistor are connected in series between the second end of the first stage circuit and the ground, a current flowing through the second resistor also flows through a first electrode and a second electrode of the second transistor, a gate of the second transistor is connected to a farther one of the first and second electrodes of the second transistor from the ground, and the second transistor is configured to reduce the current flowing through the second resistor.

3. The drive circuit according to claim 2, wherein the auxiliary circuit further comprises a third transistor and a fourth transistor, the third transistor, the first transistor, and the first resistor are connected in series between the power supply voltage and the first end of the first stage circuit, the current flowing through the first resistor also flows through a first electrode and a second electrode of the third transistor, a gate of the third transistor receives a first bias signal, and the third transistor is configured to control a maximum value of the current flowing through the first resistor to be smaller than a current value of a tail current of the first stage circuit, and the fourth transistor, the second transistor, and the second resistor are connected in series between the second end of the first stage circuit and the ground, the current flowing through the second resistor also flows through a first electrode and a second electrode of the fourth transistor, a gate of the fourth transistor receives a second bias signal, and the fourth transistor is configured to control a maximum value of the current flowing through the second resistor to be smaller than the current value of the tail current of the first stage circuit.

4. The drive circuit according to claim 3, wherein in response to the first bias signal causing the third transistor to operate in a linear region, the first output signal decreases and the current flowing through the first resistor increases, in response to the first output signal being decreased such that the third transistor operates in a saturation region, the current flowing through the first resistor reaches the maximum value, in response to the second bias signal causing the fourth transistor to operate in the linear region, the second output signal increases and the current flowing through the second resistor increases, and in response to the second output signal being increased such that the fourth transistor operates in the saturation region, the current flowing through the second resistor reaches the maximum value.

5. The drive circuit according to claim 4, wherein the second stage circuit comprises a fifth transistor and a sixth transistor, a first electrode of the fifth transistor is connected to the power supply voltage, a second electrode of the fifth transistor serves as a first end of the second stage circuit to output the third output signal, and a gate of the fifth transistor serves as a second end of the second stage circuit to receive the first output signal, and a first electrode of the sixth transistor is connected to the second electrode of the fifth transistor, a second electrode of the sixth transistor is connected to the ground, and a gate of the sixth transistor serves as a third end of the second stage circuit to receive the second output signal, wherein the fifth transistor and the sixth transistor have different polarities, the fifth transistor and the first transistor have a same polarity, and the sixth transistor and the second transistor have a same polarity.

6. The drive circuit according to claim 3, wherein the second stage circuit comprises a fifth transistor and a sixth transistor, a first electrode of the fifth transistor is connected to the power supply voltage, a second electrode of the fifth transistor serves as a first end of the second stage circuit to output the third output signal, and a gate of the fifth transistor serves as a second end of the second stage circuit to receive the first output signal, and a first electrode of the sixth transistor is connected to the second electrode of the fifth transistor, a second electrode of the sixth transistor is connected to the ground, and a gate of the sixth transistor serves as a third end of the second stage circuit to receive the second output signal, wherein the fifth transistor and the sixth transistor have different polarities, the fifth transistor and the first transistor have a same polarity, and the sixth transistor and the second transistor have a same polarity.

7. The drive circuit according to claim 2, wherein the second stage circuit comprises a fifth transistor and a sixth transistor, a first electrode of the fifth transistor is connected to the power supply voltage, a second electrode of the fifth transistor serves as a first end of the second stage circuit to output the third output signal, and a gate of the fifth transistor serves as a second end of the second stage circuit to receive the first output signal, and a first electrode of the sixth transistor is connected to the second electrode of the fifth transistor, a second electrode of the sixth transistor is connected to the ground, and a gate of the sixth transistor serves as a third end of the second stage circuit to receive the second output signal, wherein the fifth transistor and the sixth transistor have different polarities, the fifth transistor and the first transistor have a same polarity, and the sixth transistor and the second transistor have a same polarity.

8. A display drive chip, comprising a plurality of display units; and a drive circuit connected to the plurality of display units, the drive circuit comprising a first stage circuit, a second stage circuit, and an auxiliary circuit, wherein the first stage circuit is configured to receive a first input signal and a second input signal, and amplify the first input signal and the second input signal to acquire a first output signal and a second output signal and output the first output signal and the second output signal to the second stage circuit, the second stage circuit is configured to output a third output signal based on the first output signal and the second output signal to drive a load, and the second stage circuit is connected to the first stage circuit via a Miller capacitor, and the auxiliary circuit is connected to the first stage circuit and the second stage circuit for reducing an output impedance of the first stage circuit, wherein the auxiliary circuit comprises a first resistor and a second resistor, the first output signal is output by a first end of the first stage circuit, and the second output signal is output by a second end of the first stage circuit, the first resistor is connected between a power supply voltage and the first end of the first stage circuit, and the second resistor is connected between the second end of the first stage circuit and a ground.

9. The display drive chip according to claim 8, wherein the auxiliary circuit further comprises a first transistor and a second transistor, the first transistor and the first resistor are connected in series between the power supply voltage and the first end of the first stage circuit, a current flowing through the first resistor also flows through a first electrode and a second electrode of the first transistor, a gate of the first transistor is connected to a farther one of the first and second electrodes of the first transistor from the power supply voltage, and the first transistor is configured to reduce the current flowing through the first resistor, and the second transistor and the second resistor are connected in series between the second end of the first stage circuit and the ground, a current flowing through the second resistor also flows through a first electrode and a second electrode of the second transistor, a gate of the second transistor is connected to a farther one of the first and second electrodes of the second transistor from the ground, and the second transistor is configured to reduce the current flowing through the second resistor.

10. The display drive chip according to claim 9, wherein the auxiliary circuit further comprises a third transistor and a fourth transistor, the third transistor, the first transistor, and the first resistor are connected in series between the power supply voltage and the first end of the first stage circuit, the current flowing through the first resistor also flows through a first electrode and a second electrode of the third transistor, a gate of the third transistor receives a first bias signal, and the third transistor is configured to control a maximum value of the current flowing through the first resistor to be smaller than a current value of a tail current of the first stage circuit, and the fourth transistor, the second transistor, and the second resistor are connected in series between the second end of the first stage circuit and the ground, the current flowing through the second resistor also flows through a first electrode and a second electrode of the fourth transistor, a gate of the fourth transistor receives a second bias signal, and the fourth transistor is configured to control a maximum value of the current flowing through the second resistor to be smaller than the current value of the tail current of the first stage circuit.

11. The display drive chip according to claim 10, wherein in response to the first bias signal causing the third transistor to operate in a linear region, the first output signal decreases and the current flowing through the first resistor increases, in response to the first output signal being decreased such that the third transistor operates in a saturation region, the current flowing through the first resistor reaches the maximum value, in response to the second bias signal causing the fourth transistor to operate in the linear region, the second output signal increases and the current flowing through the second resistor increases, and in response to the second output signal being increased such that the fourth transistor operates in the saturation region, the current flowing through the second resistor reaches the maximum value.

12. The display drive chip according to claim 11, wherein the second stage circuit comprises a fifth transistor and a sixth transistor, a first electrode of the fifth transistor is connected to the power supply voltage, a second electrode of the fifth transistor serves as a first end of the second stage circuit to output the third output signal, and a gate of the fifth transistor serves as a second end of the second stage circuit to receive the first output signal, and a first electrode of the sixth transistor is connected to the second electrode of the fifth transistor, a second electrode of the sixth transistor is connected to the ground, and a gate of the sixth transistor serves as a third end of the second stage circuit to receive the second output signal, wherein the fifth transistor and the sixth transistor have different polarities, the fifth transistor and the first transistor have a same polarity, and the sixth transistor and the second transistor have a same polarity.

13. The display drive chip according to claim 10, wherein the second stage circuit comprises a fifth transistor and a sixth transistor, a first electrode of the fifth transistor is connected to the power supply voltage, a second electrode of the fifth transistor serves as a first end of the second stage circuit to output the third output signal, and a gate of the fifth transistor serves as a second end of the second stage circuit to receive the first output signal, and a first electrode of the sixth transistor is connected to the second electrode of the fifth transistor, a second electrode of the sixth transistor is connected to the ground, and a gate of the sixth transistor serves as a third end of the second stage circuit to receive the second output signal, wherein the fifth transistor and the sixth transistor have different polarities, the fifth transistor and the first transistor have a same polarity, and the sixth transistor and the second transistor have a same polarity.

14. The display drive chip according to claim 9, wherein the second stage circuit comprises a fifth transistor and a sixth transistor, a first electrode of the fifth transistor is connected to the power supply voltage, a second electrode of the fifth transistor serves as a first end of the second stage circuit to output the third output signal, and a gate of the fifth transistor serves as a second end of the second stage circuit to receive the first output signal, and a first electrode of the sixth transistor is connected to the second electrode of the fifth transistor, a second electrode of the sixth transistor is connected to the ground, and a gate of the sixth transistor serves as a third end of the second stage circuit to receive the second output signal, wherein the fifth transistor and the sixth transistor have different polarities, the fifth transistor and the first transistor have a same polarity, and the sixth transistor and the second transistor have a same polarity.

15. A display apparatus, comprising a display drive chip, the display drive chip comprising a plurality of display units and a drive circuit connected to the plurality of display units, the drive circuit comprising a first stage circuit, a second stage circuit, and an auxiliary circuit, wherein:

the first stage circuit is configured to receive a first input signal and a second input signal, and amplify the first input signal and the second input signal to acquire a first output signal and a second output signal and output the first output signal and the second output signal to the second stage circuit, the second stage circuit is configured to output a third output signal based on the first output signal and the second output signal to drive a load, and the second stage circuit is connected to the first stage circuit via a Miller capacitor, and the auxiliary circuit is connected to the first stage circuit and the second stage circuit for reducing an output impedance of the first stage circuit, the auxiliary circuit comprises a first resistor and a second resistor, the first output signal is output by a first end of the first stage circuit, and the second output signal is output by a second end of the first stage circuit, the first resistor is connected between a power supply voltage and the first end of the first stage circuit, and the second resistor is connected between the second end of the first stage circuit and a ground.

16. The display apparatus according to claim 15, wherein at least one of the plurality of display units comprises a display panel, and the display panel comprises at least one of a liquid crystal display panel, a micro light emitting diode display panel, a light emitting diode display panel, a mini light emitting diode display panel, a quantum dot light emitting diode display panel, an organic light emitting diode display panel, a cathode ray tube display panel, a digital light processing display panel, a field emission display panel, a plasma display panel, an electrophoretic display panel, an electrowetting display panel, or a small pitch display panel.

17. An electronic apparatus, comprising a display apparatus, the display apparatus comprising a display drive chip, the display drive chip comprising a plurality of display units and a drive circuit connected to the plurality of display units, the drive circuit comprising a first stage circuit, a second stage circuit, and an auxiliary circuit, wherein:

the first stage circuit is configured to receive a first input signal and a second input signal, and amplify the first input signal and the second input signal to acquire a first output signal and a second output signal and output the first output signal and the second output signal to the second stage circuit, the second stage circuit is configured to output a third output signal based on the first output signal and the second output signal to drive a load, and the second stage circuit is connected to the first stage circuit via a Miller capacitor, and the auxiliary circuit is connected to the first stage circuit and the second stage circuit for reducing an output impedance of the first stage circuit, the auxiliary circuit comprises a first resistor and a second resistor, the first output signal is output by a first end of the first stage circuit, and the second output signal is output by a second end of the first stage circuit, the first resistor is connected between a power supply voltage and the first end of the first stage circuit, and the second resistor is connected between the second end of the first stage circuit and a ground.

18. The electronic apparatus according to claim 17, wherein at least one of the plurality of display units comprises a display panel, and the display panel comprises at least one of a liquid crystal display panel, a micro light emitting diode display panel, a light emitting diode display panel, a mini light emitting diode display panel, a quantum dot light emitting diode display panel, an organic light emitting diode display panel, a cathode ray tube display panel, a digital light processing display panel, a field emission display panel, a plasma display panel, an electrophoretic display panel, an electrowetting display panel, or a small pitch display panel.

* * * * *